(12) United States Patent
Ukai et al.

(10) Patent No.: US 8,088,348 B2
(45) Date of Patent: Jan. 3, 2012

(54) AIR POLLUTION CONTROL SYSTEM AND METHOD FOR COAL COMBUSTION BOILER

(75) Inventors: Nobuyuki Ukai, Hiroshima (JP); Shintaro Honjo, Hiroshima (JP); Susumu Okino, Hiroshima (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 0 days.

(21) Appl. No.: 12/863,334

(22) PCT Filed: Jan. 20, 2009

(86) PCT No.: PCT/JP2009/050770
§ 371 (c)(1),
(2), (4) Date: Jul. 16, 2010

(87) PCT Pub. No.: WO2009/093575
PCT Pub. Date: Jul. 30, 2009

(65) Prior Publication Data
US 2011/0052470 A1    Mar. 3, 2011

(30) Foreign Application Priority Data
Jan. 21, 2008    (JP) .................................. 2008-010330

(51) Int. Cl.
*B01D 53/50*    (2006.01)
*B01D 53/64*    (2006.01)
*B01D 53/74*    (2006.01)
*C01F 11/46*    (2006.01)

(52) U.S. Cl. ...................... 423/210; 423/215.5; 423/235; 423/239.1; 423/243.08; 423/555; 422/168; 422/169; 422/170

(58) Field of Classification Search .................. 423/555, 423/235, 239.1, 215.5, 243.08, 210; 422/168, 422/169, 170
See application file for complete search history.

(56) References Cited

U.S. PATENT DOCUMENTS
3,977,890 A * 8/1976 Jaunarajs et al. ............. 106/782
(Continued)

FOREIGN PATENT DOCUMENTS
JP    57-015822 A    1/1982
(Continued)

OTHER PUBLICATIONS
International Search Report of PCT/JP2009/050770, Mailing Date of Apr. 21, 2009.
(Continued)

*Primary Examiner* — Timothy Vanoy
(74) *Attorney, Agent, or Firm* — Westerman, Hattori, Daniels & Adrian, LLP

(57) ABSTRACT

An air pollution control system for a coal combustion boiler includes: a NOx removing apparatus that reduces nitrogen oxide contained in flue gas emitted from this coal combustion boiler, an air pre-heater that recovers heat in the gas, a precipitator 15 that reduces particulates from the gas, a liquid-gas contact type desulfurizer that removes sulfur oxide by way of a limestone-gypsum method and reduces mercury oxide in the gas, a stack that releases the gas after SOx removal to the exterior, and a solid-liquid separator that extracts limestone-gypsum containing slurry from the desulfurizer to the exterior and performs a solid-liquid separation, where water separated in the solid-liquid separator is removed, and concentrated slurry is sent back to the bottom of the desulfurizer to make the gypsum concentration of slurry equal to or higher than 10 percent in the desulfurizer.

6 Claims, 5 Drawing Sheets

U.S. PATENT DOCUMENTS

| | | | | |
|---|---|---|---|---|
| 3,985,860 | A | * | 10/1976 | Mandelik et al. ........ 423/243.03 |
| 4,337,238 | A | * | 6/1982 | Cody et al. .................... 423/555 |
| 4,832,936 | A | * | 5/1989 | Holter et al. .................. 423/555 |
| 6,638,485 | B1 | | 10/2003 | Iida et al. |
| 2003/0170159 | A1 | | 9/2003 | Honjo et al. |

FOREIGN PATENT DOCUMENTS

| | | |
|---|---|---|
| JP | 10-230137 A | 9/1998 |
| JP | 2000-015052 A | 1/2000 |
| JP | 2003-053142 A | 2/2003 |
| JP | 2003-236334 A | 8/2003 |
| JP | 2004-313833 A | 11/2004 |
| JP | 2007-007612 A | 1/2007 |

OTHER PUBLICATIONS

Hiroyuki, Akiho et al.; "Capturing Characteristic of Gaseous Mercury in Desulfurization Solutions Simulating the Limestone-Gypsum Process"; Journal of the Japan Inst. of Energy, vol. 83, pp. 924-931, (2004) (w/English Abstract and cited in Japanese Office Action).

Japanese Office Action dated Mar. 15, 2011, issued in corresponding Japanese Patent Application No. 2008-010330.

* cited by examiner

AIR POLLUTION CONTROL SYSTEM AND METHOD FOR COAL COMBUSTION BOILER

TECHNICAL FIELD

The present invention relates to an air pollution control system and an air pollution control method both of which are for a coal combustion boiler that reduces mercury contained in flue gas from the boiler.

BACKGROUND ART

Due to the fact that flue gas emitted from a boiler, such as one that is a combustor in a thermal power plant, for example, contains highly toxic mercury, various systems for reducing mercury contained in the flue gas have been developed.

A boiler typically includes a wet-type desulfurizer for reducing sulfur contained in the flue gas. It is widely known that, in a flue gas control facility including such a boiler having the desulfurizer provided thereto as an air pollution control apparatus, if the amount of chlorine (Cl) contained in the flue gas increases, the ratio of divalent metallic mercury that is water soluble increases, and the desulfurizer can collect mercury more easily.

Various inventions related to a method or an apparatus for controlling metallic mercury by combining a NOx removing apparatus that removes NOx and the wet-type desulfurizer that uses an alkali absorbent as a SOx absorbent have been devised recently (Patent Document 1).

A reducing method using an adsorbent such as activated carbon or a selenium filter is commonly known as a method for controlling metallic mercury contained in flue gas. However, because such a method requires a special adsorbing-reducing unit, the method is not suited for controlling a large volume of flue gas from a power plant, for example.

As a method for controlling metallic mercury contained in a large volume of flue gas, a limestone-gypsum method using a gas-liquid contact type desulfurizer has been widely employed as a method for reducing SOx through reactions expressed by formulas (1) and (2) below:

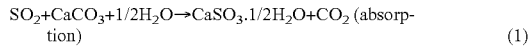

$$SO_2+CaCO_3+1/2H_2O \rightarrow CaSO_3 \cdot 1/2H_2O+CO_2 \text{ (absorption)} \quad (1)$$

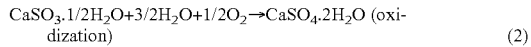

$$CaSO_3 \cdot 1/2H_2O+3/2H_2O+1/2O_2 \rightarrow CaSO_4 \cdot 2H_2O \text{ (oxidization)} \quad (2)$$

[Patent Document 1] Japanese Patent Laid-open No. 2007-7612

DISCLOSURE OF INVENTION

Problem To Be Solved By the Invention

In the gas-liquid contact type desulfurizer, mercury oxide ($Hg^{2+}$) is adsorbed to and immobilized by gypsum slurry absorbent (hereinafter, also referred to as "slurry") to reduce mercury. In this process, the speed of mercury (Hg) reduction generally depends on the speed of gypsum ($CaSO_4$) generation.

Therefore, to increase the speed of mercury reduction, it is necessary to increase the speed of gypsum ($CaSO_4$) generation; however, because the ratio of mercury (Hg) and sulfur (S) contained in a coal depends on the properties of the coal, it is difficult to increase only the speed of gypsum generation.

Therefore, if the amount of gypsum produced in the slurry containing gypsum-limestone is small when using a coal containing less sulfur (S) with respect to mercury (Hg), the performance of mercury (Hg) reduction might be insufficient.

In addition, air or oxygen-enriched air is added to keep the slurry oxidized, to prevent mercury oxide ($Hg^{2+}$) from being reduced ($Hg^{2+} \rightarrow Hg^0$), and to prevent the re-entrainment of zero-valent mercury ($Hg^0$ to a gaseous phase.

However, if the flue gas contains a large volume of reducing substance, a predetermined level of oxidization (oxidation-reduction potential (ORP) of equal to or more than +150 millivolts) may not be maintained, and the re-entrainment of zero-valent mercury ($Hg^0$) to the gaseous phase may not be suppressed. Therefore, it is desirable to reduce mercury contained in flue gas effectively by way of other countermeasures.

In consideration of the above, an object of the present invention is to provide an air pollution control system and an air pollution control method both of which are for a coal combustion boiler capable of effectively reducing mercury contained in flue gas emitted from the coal combustion boiler.

Means For Solving Problem

According to an aspect of the present invention, an air pollution control system for a coal combustion boiler includes: a NOx removing apparatus that removes nitrogen oxide contained in flue gas emitted from the coal combustion boiler; an air pre-heater that recovers heat in the gas after the nitrogen oxide is removed; a precipitator that reduces particulates from the gas after the heat is recovered; a liquid-gas contact type desulfurizer that removes sulfur oxide by way of a limestone-gypsum method and reduces mercury oxide in the gas after the particulates are reduced; and a stack that releases gas after SOx removal. A gypsum concentration in slurry is kept equal to or higher than 10 percent in the desulfurizer.

According to another aspect of the present invention, an air pollution control system for a coal combustion boiler, the air pollution control system includes: a NOx removing apparatus that removes nitrogen oxide contained in flue gas emitted from the coal combustion boiler; an air pre-heater that recovers heat in the gas after the nitrogen oxide is removed; a precipitator that reduces particulates from the gas after the heat is recovered; a liquid-gas contact type desulfurizer that removes sulfur oxide by way of a limestone-gypsum method and reduces mercury oxide in the gas after the particulates are reduced; a stack that releases gas after SOx removal; and a shear force applying unit that applies a shear force to limestone-gypsum containing slurry.

According to still another aspect of the present invention, an air pollution control system for a coal combustion boiler, the air pollution control system includes: a NOx removing apparatus that removes nitrogen oxide contained in flue gas emitted from the coal combustion boiler; an air pre-heater that recovers heat in the gas after the nitrogen oxide is removed; a precipitator that reduces particulates from the gas after the heat is recovered; a liquid-gas contact type desulfurizer that removes sulfur oxide by way of a limestone-gypsum method and reduces mercury oxide in the gas after the particulates are reduced; and a stack that releases gas after SOx removal. A sulfate-based compound is added to limestone-gypsum containing slurry.

According to still another aspect of the present invention, an air pollution control method for a coal combustion boiler using a liquid-gas contact type desulfurizer that removes sulfur oxide by way of a limestone-gypsum method and reduces mercury oxide contained in flue gas emitted from the coal combustion boiler, includes: keeping a gypsum concentration in slurry equal to or higher than 10 percent in the desulfurizer.

According to still another aspect of the present invention, an air pollution control method for a coal combustion boiler using a liquid-gas contact type desulfurizer that removes sulfur oxide by way of a limestone-gypsum method and reduces mercury oxide contained in flue gas emitted from the coal combustion boiler, includes: applying a shear force to limestone-gypsum containing slurry.

According to still another aspect of the present invention, an air pollution control method for a coal combustion boiler using a liquid-gas contact type desulfurizer that removes sulfur oxide by way of a limestone-gypsum method and reduces mercury oxide contained in flue gas emitted from the coal combustion boiler, includes: adding a sulfate-based compound to limestone-gypsum containing slurry.

Effect of the Invention

According to the present invention, the contact efficiency between mercury contained in the flue gas and the gypsum can be improved, and adsorption/immobilization of the mercury can be promoted.

Figure 1:
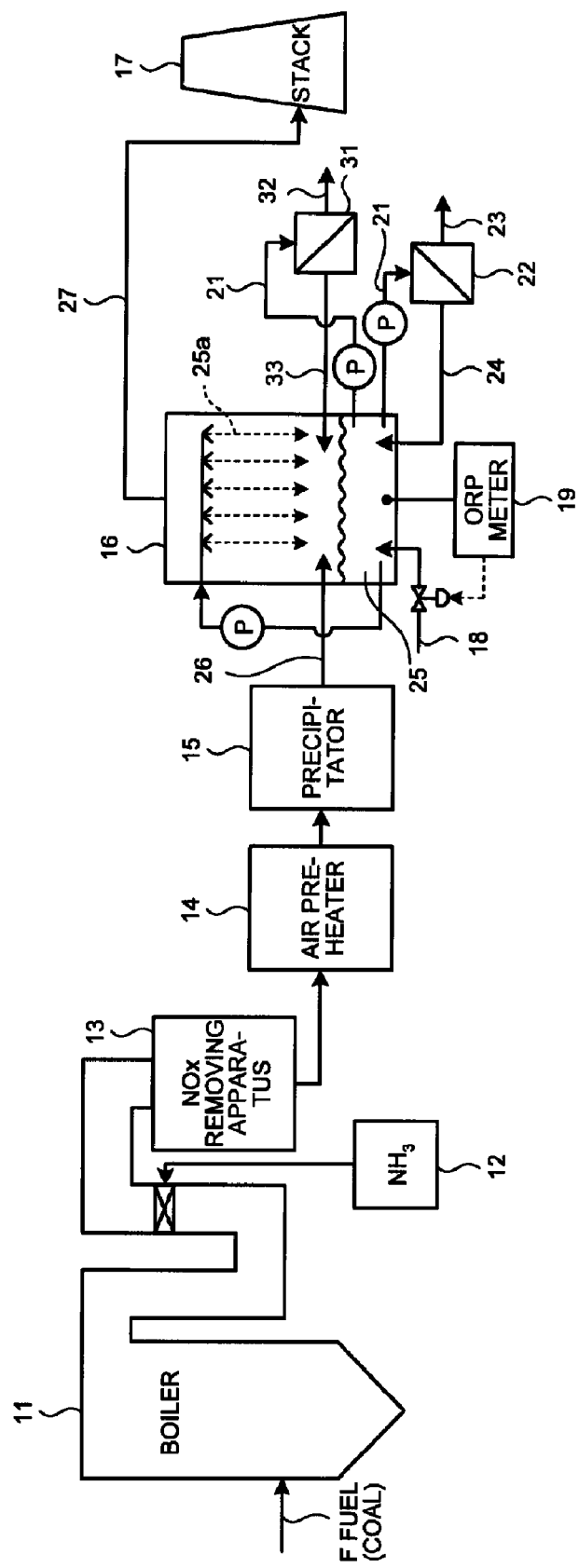
FIG. 1 is a schematic of an air pollution control system according to a first embodiment of the present invention.

EXPLANATIONS OF LETTERS OR NUMERALS 11 coal combustion boiler
12 ammonia
13 NOx removing apparatus
14 air pre-heater
15 precipitator
16 desulfurizer
17 stack
21 limestone-gypsum containing slurry
22 solid-liquid separator
23 water
24 concentrated slurry
25 slurry

BEST MODE(S) FOR CARRYING OUT THE INVENTION

The present invention will now be explained in detail with reference to the drawings. An embodiment of the present invention disclosed herein is not intended to limit the scope of the present invention in any way. Furthermore, elements disclosed in the embodiment include elements that can be easily thought of by those skilled in the art and elements that are substantially identical.

First Embodiment

An air pollution control system for a coal combustion boiler according to an embodiment of the present invention will now be explained with reference to the drawings.

FIG. 1 is a schematic of the air pollution control system for the coal combustion boiler according to the embodiment.

As illustrated in FIG. 1, the air pollution control system according to the embodiment includes: a NOx removing apparatus 13 that removes nitrogen oxide contained in flue gas emitted from a coal combustion boiler 11 by adding ammonia 12 thereto, an air pre-heater 14 that recovers heat in the gas after the nitrogen oxide is removed, a precipitator 15 that reduces particulates from the gas after the heat is recovered, a liquid-gas contact type desulfurizer 16 that removes sulfur oxide by way of the limestone-gypsum method and reduces mercury oxide contained in the gas after the particulates are reduced, and a stack 17 that releases purified gas 27 after the sulfur and the mercury are reduced to the exterior, where the gypsum concentration in slurry 25 is kept equal to or higher than 10 percent in the desulfurizer 16.

Furthermore, to adjust the gypsum concentration, a solid-liquid separator 22 for extracting limestone-gypsum containing slurry 21 from the desulfurizer 16 to the exterior and for performing solid-liquid separation may be included. Water 23 separated in the solid-liquid separator 22 is removed, and concentrated slurry 24 is sent to the lower portion of the desulfurizer 16 to keep the gypsum concentration in the slurry 25 equal to or higher than 10 percent in the desulfurizer 16.

In the drawing, the reference numeral 18 denotes air for oxidization, and the reference numeral 19 denotes an oxidation-reduction potential measuring meter (ORP meter).

The slurry 25 having a higher concentration of the gypsum in the desulfurizer 16 is supplied to the upper area of the desulfurizer 16 by way of a pump P and sprayed 25a by way of a spray, and a sulfur component and mercury contained in flue gas 26 is reduced through gas-liquid contact.

The air pollution control system further includes a gypsum separator 31 that extracts the limestone-gypsum containing slurry 21 from the desulfurizer 16 to the exterior and separates the gypsum 32 therefrom. The gypsum 32 is removed in the gypsum separator 31, and water 33 separated therefrom is sent back to the lower area of the desulfurizer 16. The water 33 is discharged to the exterior as required.

According to the embodiment, the gypsum concentration in the slurry 25 is increased in the desulfurizer 16 to improve the probability that the mercury (Hg) contained in the flue gas guided into the desulfurizer 16 contacts the gypsum ($CaSO_4$). As a result, adsorption/immobilization of the mercury can be promoted.

Figure 5:
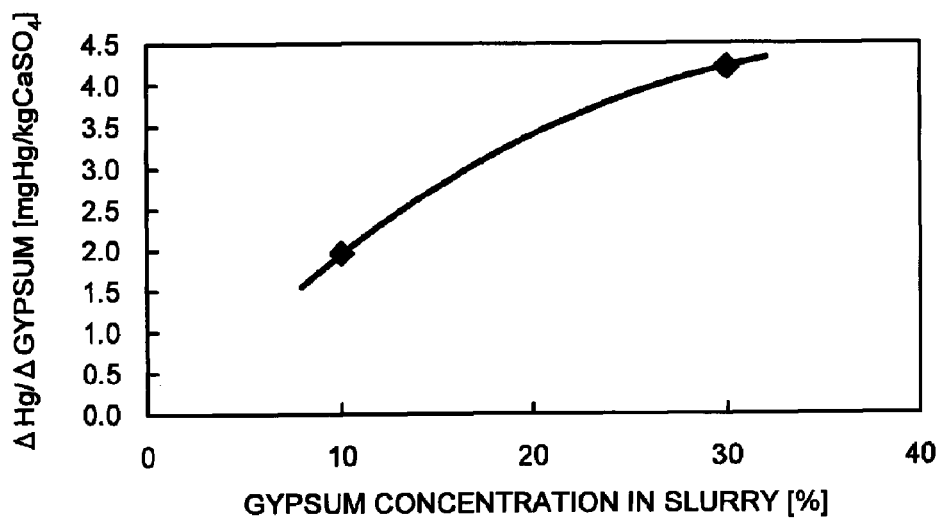
FIG. 5 is a schematic of a relationship between the gypsum concentration in slurry and the amount of adsorbed mercury.

It has been proven that there is a direct relationship between a higher gypsum concentration in the slurry 25 in the desulfurizer 16 and a higher mercury adsorbing efficiency as depicted in FIG. 5. FIG. 5 is a schematic indicating a relationship between the gypsum concentration (%) in the slurry and the amount of adsorbed mercury/amount of generated gypsum ($\Delta Hg/\Delta gypsum$).

Therefore, by keeping the gypsum concentration to 10 to 30 percent, the probability of the mercury (Hg) contained in the flue gas contacting the gypsum ($CaSO_4$) can be increased. As a result, adsorption/immobilization of the mercury can be promoted, to improve the efficiency of reducing mercury contained in the flue gas.

Furthermore, in the present embodiment, the gypsum separator 31 and the solid-liquid separator 22 are arranged separately; however, the present invention is not limited thereto, and these separators may be formed in a single solid-liquid separator having two channels through which each of the separated water 23 and the concentrated slurry 24 is sent back to the desulfurizer 16 or discharged to the outside of the system. Thus, a single solid-liquid separating facility can be used to accommodate with an increase/decrease of the concentration. The concentrated slurry (dehydrated gypsum) is sent back to increase the slurry concentration, and the separated water 23 is sent back to decrease the concentration.

Second Embodiment

Figure 2:
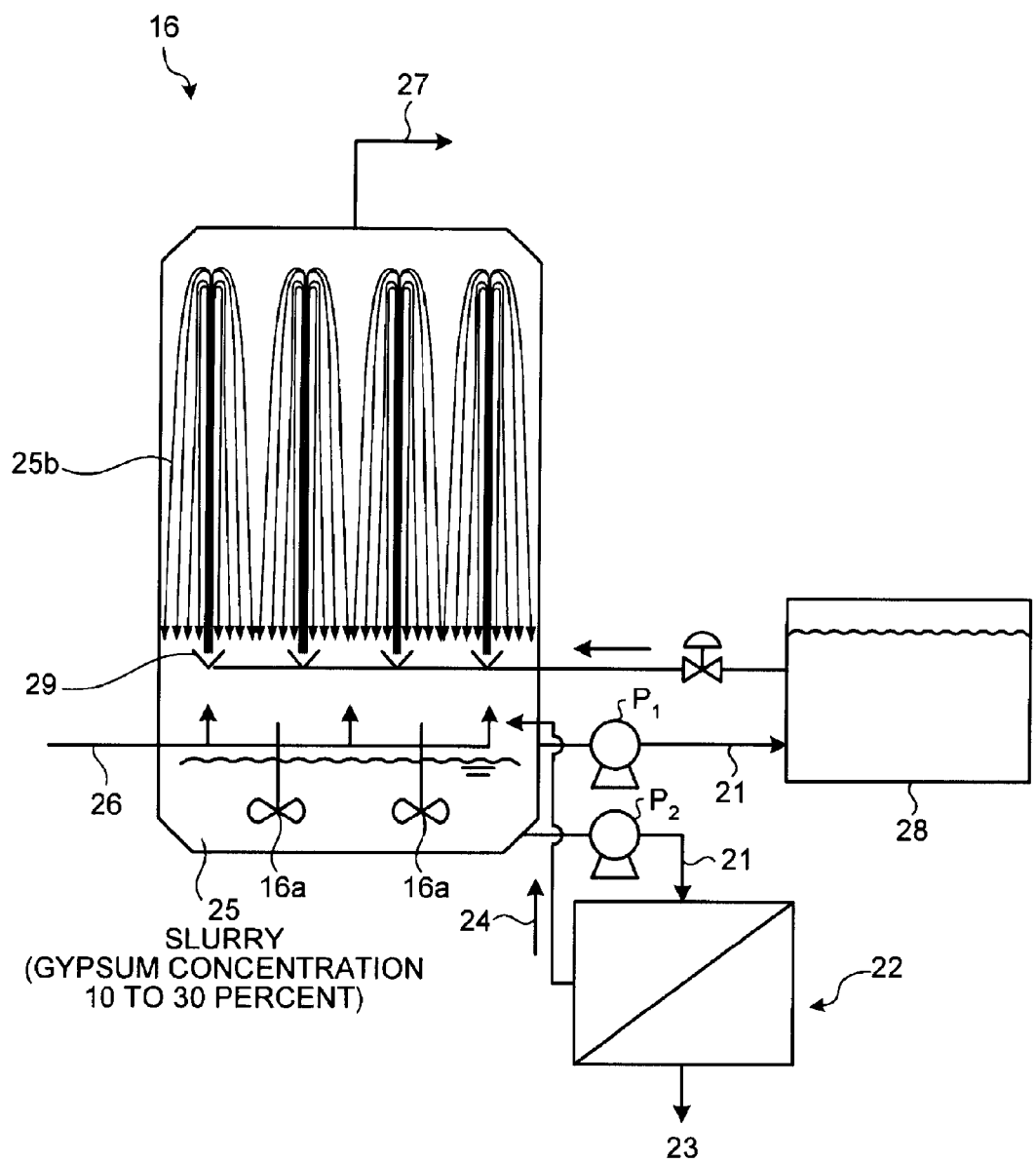
FIG. 2 is schematic of a desulfurizer according to a second embodiment of the present invention.

Furthermore, as an embodiment of the present invention, a gas-liquid contacting desulfurizer having a structure for jetting out the slurry, such as one illustrated in FIG. 2, may also be used.

In FIG. 2, the slurry 25 is extracted from the desulfurizer 16, pressurized in a pressurizing tank 28, sent to the jet 29, and then gushed out as liquid column-like slurry 25b from the lower area toward the upper area. In the drawing, the reference numeral 16a denotes stirring blades for stirring the slurry deposited in the bottom of the desulfurizer 16.

In other words, in the gas-liquid contact type in which the slurry is sprayed down from the upper area of the apparatus such as one according to the first embodiment, fillers may be packed in the apparatus to improve the gas contact efficiency. In such a scenario, when the gypsum concentration in the slurry reaches about 30 percent, good slurry behavior cannot be achieved, resulting in clogging of the packed bed, whereby the contact efficiency between mercury and the slurry declines.

By using the liquid column-like slurry 25b such as the one according to the present embodiment, the discharging efficiency of the jet 29 rarely declines even if the gypsum concentration in the slurry increases, and good slurry behavior can be achieved. Thus, the contact efficiency between mercury and the slurry does not decline. Therefore, it can be said that, in comparison with the first embodiment, the present embodiment is more suitable for reducing the mercury contained in the flue gas when the gypsum concentration is high.

Third Embodiment

Figure 3:
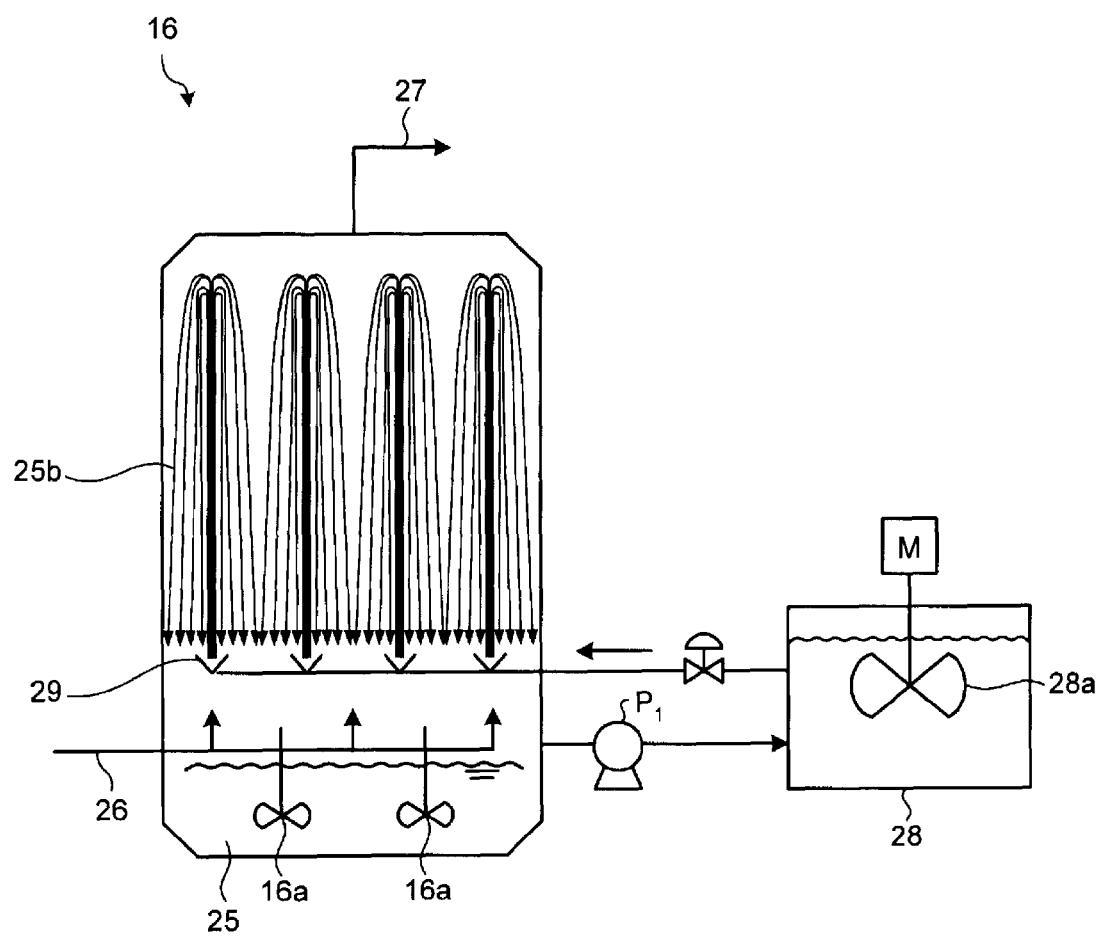
FIG. 3 is a schematic of a desulfurizer according to a third embodiment of the present invention.

Furthermore, as an embodiment of the present invention, as illustrated in FIG. 3, stirring blades 28a for forcibly stirring the slurry in the pressurizing tank 28 may be included, so that a shear force is applied to the gypsum contained in the slurry to increase the specific surface area of gypsum particles in the absorbent (limestone-gypsum slurry), as well as to increase the number of particles.

The pressurizing tank 28 may be included as required, and the liquid column-like slurry 25b may be formed by way of a pump $P_1$ via the jet 29.

In this manner, the probability of the mercury (Hg) contained in the flue gas contacting the gypsum ($CaSO_4$) can be increased, and, as a result, adsorption/immobilization of the mercury can be promoted; thus, the efficiency of reducing the mercury contained in the flue gas can be improved.

Fourth Embodiment

Figure 4:
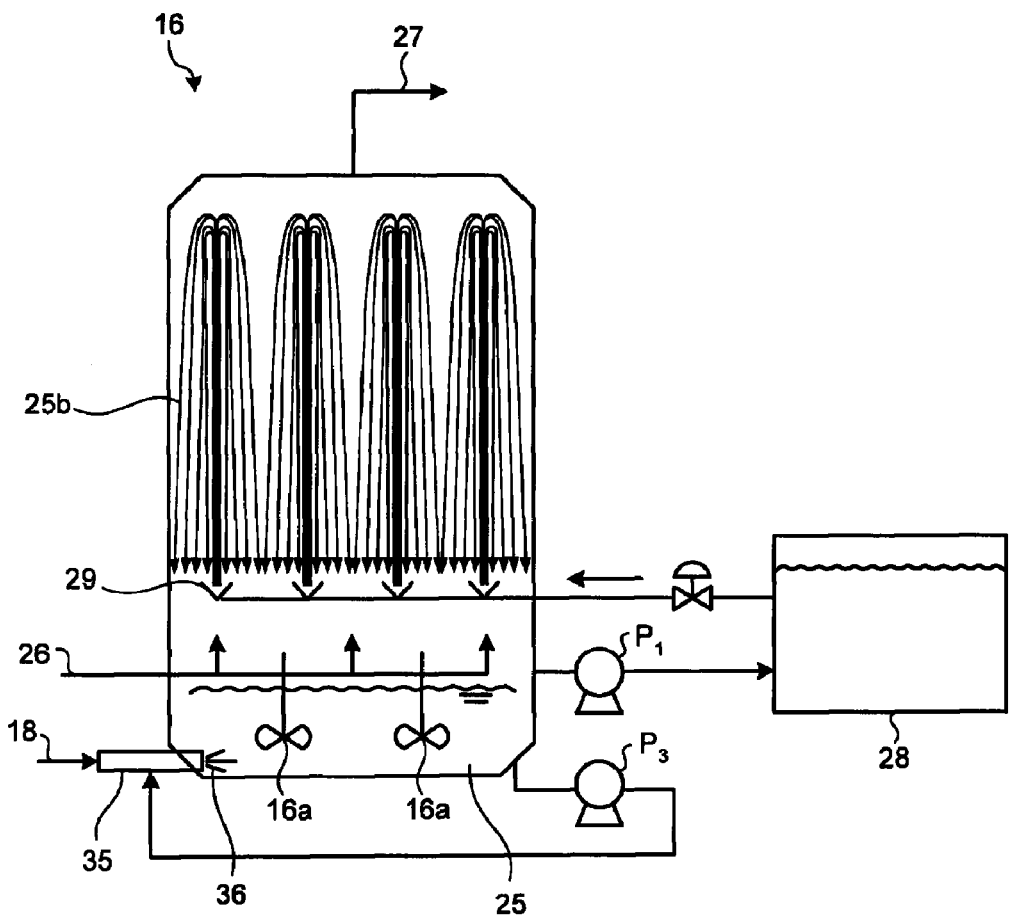
FIG. 4 is a schematic of a desulfurizer according to a fourth embodiment of the present invention.

Furthermore, as an embodiment of the present invention, as illustrated in FIG. 4, a sparger 35 for causing the slurry, accompanying gas, from an absorbent circulating pump $P_3$ to be gushed out with the air 18 as a gushing flow 36 may be arranged in the bottom of the desulfurizer 16, so as to increase the specific surface area of the gypsum particles in the absorbent (limestone-gypsum slurry) as well as to increase the number of particles.

In this manner, the probability of the mercury (Hg) contained in the flue gas contacting the gypsum ($CaSO_4$) can be increased, and, as a result, adsorption/immobilization of the mercury can be promoted, whereby the efficiency of reducing the mercury contained in the flue gas can be improved.

Fifth Embodiment

Figure 6:
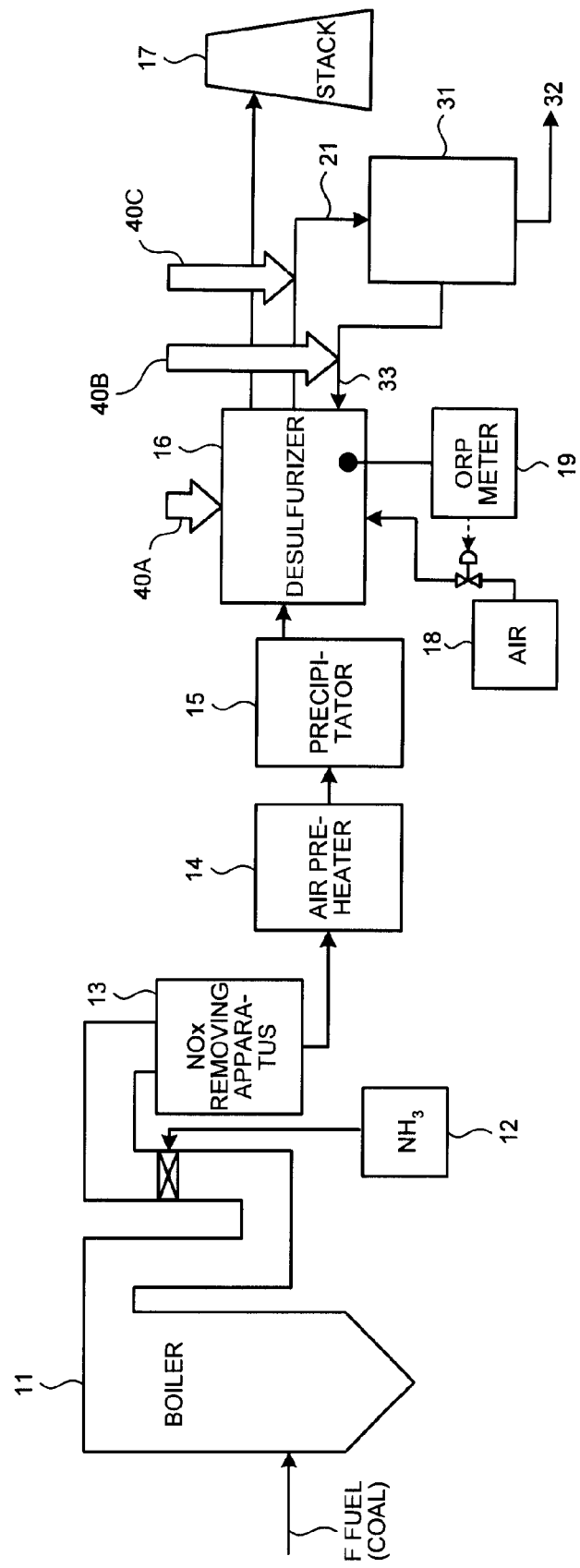
FIG. 6 is a schematic of an air pollution control system according to a fifth embodiment of the present invention.

Furthermore, as illustrated in FIG. 6, a sulfate-based compound such as a sulfated compound ($SO_4^{2-}$) or a sulfite compound ($SO_3^{2-}$) may be added to the absorbent (limestone-gypsum slurry) 21 in the desulfurizer 16 of a gas-liquid contactor, to promote the generation of gypsum in the slurry so that the gypsum concentration is increased.

Reaction formulas for generating gypsum to increase the gypsum concentration are indicated as (3) to (5) below:

$$SO_3^{2-} + Ca^{2+} \rightarrow CaSO_3 \tag{3}$$

$$CaSO_3 + 1/2 O_2 \rightarrow CaSO_4 \text{ (gypsum generated by way of oxidization)} \tag{4}$$

$$SO_4^{2-} + Ca^{2+} \rightarrow CaSO_4 \text{ (gypsum generation)} \tag{5}$$

The sulfated compound may be added in the gas-liquid contactor (40A), or to the absorbent on an upstream side (40B) or a downstream side (40C) of the gypsum separator 31.

As described above, according to the present invention, adsorption/immobilization of the mercury can be promoted by increasing the probability of the mercury contacting the gypsum.

Therefore, according to the embodiment, the amount of gypsum generated in the slurry can be increased by adding a sulfate-based compound, and adsorption/immobilization of the mercury can actively be promoted.

Furthermore, the first to the fifth embodiments can be combined as appropriate to further promote adsorption/immobilization of the mercury by way of such a combination.

INDUSTRIAL APPLICABILITY

As described above, in the air pollution control system and the air pollution control method according to the present invention, adsorption/immobilization of the mercury can be promoted by increasing the probability of the mercury contacting the gypsum. Accordingly, they are suitable for controlling air pollution when a restriction is imposed on the amount of an emission of mercury contained in the flue gas.

The invention claimed is:

1. An air pollution control system for a coal combustion boiler, the air pollution control system comprising:
    a NOx removing apparatus that removes nitrogen oxide contained in flue gas emitted from the coal combustion boiler;
    an air pre-heater that recovers heat in the gas after the nitrogen oxide is removed;
    a precipitator that reduces particulates from the gas after the heat is recovered;
    a liquid-gas contact type desulfurizer that removes sulfur oxide by way of a limestone-gypsum method and reduces mercury oxide in the gas after the particulates are reduced; and
    a stack that releases gas after SOx removal, wherein
    the system further comprises a solid-liquid separator suitable for extracting limestone-gypsum containing slurry from the desulfurizer to the exterior and performing a solid-liquid separation where water separated in the solid-liquid separator is removed and concentrated slurry is sent back to the bottom of the desulfurizer in order to keep a gypsum concentration in slurry equal to or higher than 10 percent in the desulfurizer.

2. An air pollution control system for a coal combustion boiler, the air pollution control system comprising:
- a NOx removing apparatus that removes nitrogen oxide contained in flue gas emitted from the coal combustion boiler;
- an air pre-heater that recovers heat in the gas after the nitrogen oxide is removed;
- a precipitator that reduces particulates from the gas after the heat is recovered;
- a liquid-gas contact type desulfurizer that removes sulfur oxide by way of a limestone-gypsum method and reduces mercury oxide in the gas after the particulates are reduced;
- a stack that releases gas after SOx removal;
- wherein the system further comprises a shear force applying unit that applies a shear force to the limestone-gypsum containing slurry, and
- the unit includes a pressurizing tank for pressurizing the slurry extracted from the desulfurizer, and stirring blades for forcibly stirring the slurry in the pressurizing tank.

3. An air pollution control system for a coal combustion boiler, the air pollution control system comprising:
- a NOx removing apparatus that removes nitrogen oxide contained in flue gas emitted from the coal combustion boiler;
- an air pre-heater that recovers heat in the gas after the nitrogen oxide is removed;
- a precipitator that reduces particulates from the gas after the heat is recovered;
- a liquid-gas contact type desulfurizer that removes sulfur oxide by way of a limestone-gypsum method and reduces mercury oxide in the gas after the particulates are reduced; and
- a stack that releases gas after SOx removal, wherein
- the system further comprises a gypsum separator suitable for extracting the limestone-gypsum containing slurry from the desulfurizer to the exterior, separating the gypsum therefrom, sending back water separated therefrom to the lower area of the desulfurizer, and adding a sulfated compound ($SO_4^{2-}$) or a sulfite compound ($SO_3^{2-}$) to the limestone-gypsum slurry in the desulfurizer on an upstream side or a downstream side of the gypsum separator.

4. An air pollution control method for a coal combustion boiler using a liquid-gas contact type desulfurizer that removes sulfur oxide by way of a limestone-gypsum method and reduces mercury oxide contained in flue gas emitted from the coal combustion boiler, the air pollution control method comprising:
- extracting the limestone-gypsum containing slurry from the desulfurizer to the exterior in a solid-liquid separator provided downstream the desulfurizer,
- performing a solid-liquid separation where water separated in the solid-liquid separation is removed,
- sending concentrated slurry back to the bottom of the desulfurizer, and
- keeping a gypsum concentration in slurry equal to or higher than 10 percent in the desulfurizer.

5. An air pollution control method for a coal combustion boiler using a liquid-gas contact type desulfurizer that removes sulfur oxide by way of a limestone-gypsum method and reduces mercury oxide contained in flue gas emitted from the coal combustion boiler, the air pollution control method comprising:
- applying a shear force to limestone-gypsum containing slurry,
- wherein the applying includes pressurizing the slurry extracted from the desulfurizer, and
- forcibly stirring the slurry in a pressurizing tank provided downstream of the desulfurizer by means of stirring blades, wherein the stirring blades are provided in the pressurizing tank.

6. An air pollution control method for a coal combustion boiler using a liquid-gas contact type desulfurizer that removes sulfur oxide by way of a limestone-gypsum method and reduces mercury oxide contained in flue gas emitted from the coal combustion boiler, the air pollution control method comprising:
- adding a sulfated compound ($SO_4^{2-}$) or a sulfite compound ($SO_3^{2-}$) to the limestone-gypsum slurry in the desulfurizer on an upstream side or a downstream side of a gypsum separator, wherein the gypsum separator is arranged downstream of the desulfurizer.

* * * * *